United States Patent
Reid

[15] 3,673,082
[45] June 27, 1972

[54] APPARATUS AND METHOD FOR AERATING WASTE MATERIAL

[72] Inventor: James S. Reid, Hudson, Ohio

[73] Assignee: The Standard Products Company, Cleveland, Ohio

[22] Filed: April 26, 1971

[21] Appl. No.: 137,129

[52] U.S. Cl. .................................210/12, 4/10, 4/115, 210/15, 210/138, 210/149, 210/152, 210/220
[51] Int. Cl. ........................................................C02c 1/02
[58] Field of Search ..................210/12, 15, 138, 149, 152, 210/220; 4/8, 10, 115

[56] References Cited

UNITED STATES PATENTS

| 2,249,739 | 7/1941 | Brownell et al. | 4/115 X |
|---|---|---|---|
| 3,419,146 | 12/1968 | Koulovatos | 210/138 |
| 3,337,449 | 8/1967 | Kappe | 210/138 X |
| 2,658,202 | 11/1953 | Wolman et al. | 4/8 |

Primary Examiner—Michael Rogers
Attorney—Meyer, Tilberry & Body

[57] ABSTRACT

Liquid and organic waste material in a waste tank is aerated by periodically operating an air pump at spaced intervals of time.

5 Claims, 2 Drawing Figures

PATENTED JUN 27 1972    3,673,082

INVENTOR.
JAMES S. REID
BY
Meyer, Tilberry & Body
ATTORNEYS

APPARATUS AND METHOD FOR AERATING WASTE MATERIAL

BACKGROUND OF THE INVENTION

This application pertains to the art of waste disposal and more particularly to aeration of liquid and organic waste material. The invention is particularly applicable to use with a waste disposal system installed on a human conveyance and will be described with particular reference thereto although it will be appreciated that the invention has broader applications and may be used on fixed installations.

Waste disposal systems of a known type for human conveyances include a waste tank for receiving liquid and organic waste material from a toilet, lavatory, shower or sink. Liquid effluent from the waste tank is fed to a heated vaporizer for vaporizing and burning the waste material. One system of this type is described in U. S. Patent Re. 26,891 issued May 26, 1970.

In waste disposal systems of the type described, it is desirable that organic solids be converted to liquid by septic action in the waste tank. The septic action may be produced by either aerobic or anaerobic bacteria. In the waste tank, a thick scum forms on the surface of the waste material to exclude air therefrom. This is an ideal situation for anaerobic bacterial action because anaerobic bacteria live and thrive only when shut off from air. In a fixed installation, the scum effectively excludes air from the waste material so that anaerobic bacteria efficiently convert organic solids to liquids. On a human conveyance, sloshing of the waste material in the waste tank during movement of the conveyance disturbs the scum and exposes the surface of the waste material to some air. Anaerobic bacteria cannot survive and thrive under such conditions so that conversion of organic solids to liquid is very inefficient. The disturbance of the scum which exposes the waste material to air does not provide sufficient air to maintain efficient aerobic bacterial action. Aerobic bacteria can thrive only if the waste material is exposed to more air than in the manner described.

One arrangement for achieving highly efficient aerobic treatment of the waste material includes attachment of an air pump to the waste tank for bubbling air through the waste material. However, addition of excess air to the waste material will also destroy the aerobic bacteria. An extremely high concentration of oxygen will result in oxidation of the aerobic bacteria themselves. Therefore, it is desirable to supply only sufficient air to maintain efficient aerobic action. One manner of accomplishing this would be to provide a metering air pump which runs continuously and supplies a small quantity of air to the waste material at all times. However, in a conveyance of the type described a continuous supply of air is not necessary because the waste tank may not be used. Running an air pump continuously drains electricity needlessly. It would be desirable to have an aeration arrangement for supplying air to the waste material only at periodic spaced intervals of time.

SUMMARY OF THE INVENTION

A waste disposal system of the type described is provided with an electrically driven air pump for bubbling air through waste material in the waste tank. Automatic pump control means is provided for periodically energizing the pump to aerate the waste material at spaced intervals of time. This arrangement prevents over-supply of oxygen and avoids oxidation of the aerobic bacteria themselves. The described arrangement further saves on electricity and wear of the air pump.

In accordance with one arrangement, the automatic pump control means comprises an electrical appliance having a control circuit which includes a temperature responsive control means for operating the appliance at spaced intervals of time to maintain a predetermined temperature. The pump is connected in the control circuit of the appliance for simultaneous operation therewith at periodic spaced intervals of time. In accordance with one arrangement, the appliance is a refrigerator which runs only at periodic intervals in accordance with the setting of a thermostat to maintain a predetermined temperature within the refrigerator. Automatic periodic operation of the air pump in this manner is accomplished without the need of a separate and expensive timing device or the like for the desired periodic operation of the air pump. The use of an existing circuit on an appliance for periodically operating the air pump is a highly efficient arrangement which makes economical installation possible.

It is a principal object of the present invention to provide an improved apparatus and method for aerating waste material in a waste tank.

It is also an object of the present invention to provide a periodic aerating arrangement by utilizing an existing control circuit on a separate appliance.

It is another object of the present invention to provide an improved arrangement for aerating waste material in a waste tank on a human conveyance.

BRIEF DESCRIPTION OF THE DRAWING

The invention may take physical form in certain parts and arrangements of parts, a preferred embodiment of which will be described in detail in this specification and illustrated in the accompanying drawings which form a part hereof.

DESCRIPTION OF THE PREFERRED EMBODIMENT

Figure 1:
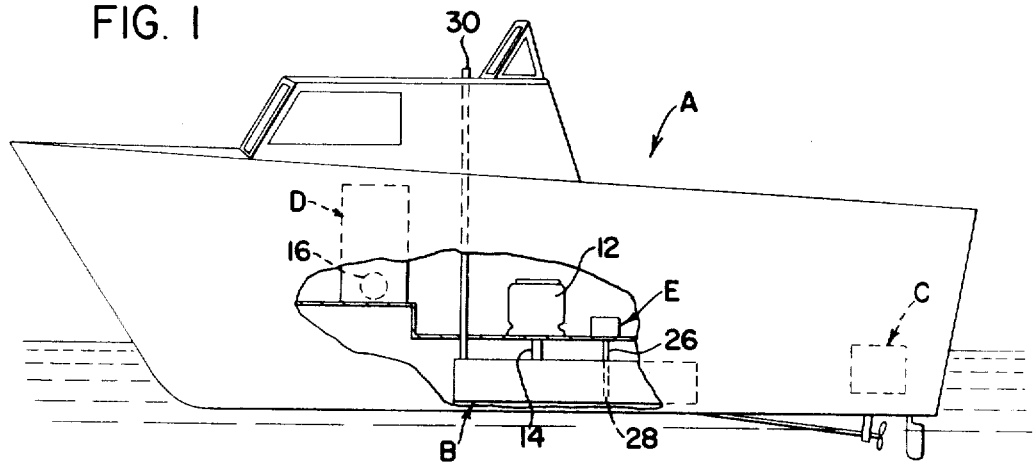
FIG. 1 is a side elevational view of a human conveyance having the improvements of the present invention incorporated therein and with portions cut away for clarity of illustration.
Figure 2:
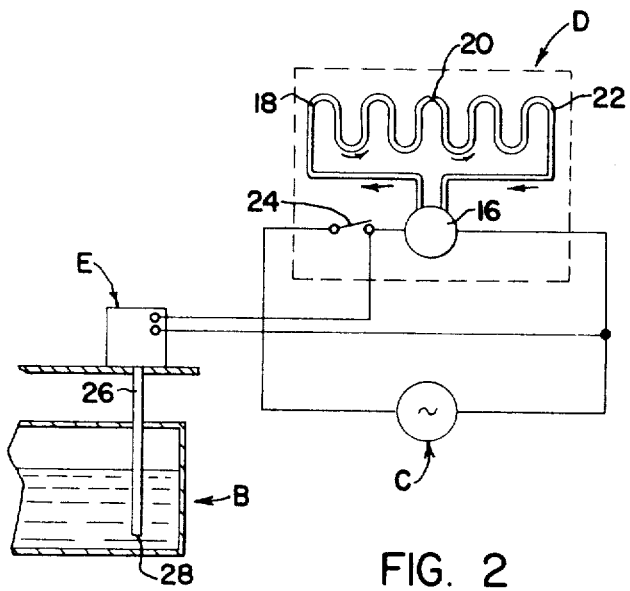
FIG. 2 is a diagrammatic showing of a control circuit for use with the present invention.

Referring now to the drawings, wherein the showings are for purposes of illustrating a preferred embodiment of the invention only and not for purposes of limiting same, FIG. 1 shows a boat A which serves as a human conveyance. It will be recognized that the present invention can be used with other forms of human conveyances, such as buses, motor homes and airplanes. The principals of the present invention can also be used in fixed installations as with cabins or homes.

Boat A has sanitary facilities including a toilet 12 which discharges through conduit 14 to waste tank B. Other sanitary facilities on boat A may include a shower, lavatory and sink which also discharge into tank B, and supply liquid and organic waste material thereto. Boat A is provided with an electrical generator C for powering electrical devices on the boat. One such electrical device may include a refrigerator D. Refrigerator D includes an electrically driven compressor 16 which is supplied with electrical energy from generator C. Compressor 16 delivers gas, such as sulfur dioxide or ethylchloride, at high temperature and pressure to air cooled condensing coils 18 so that the gas is condensed to a liquid under high pressure. The liquified gas passes through a throttling valve 20 and passes through evaporating coil 22. Heat is removed from the interior of the refrigerator by evaporating coils 22. Compressor 16 is connected in a control circuit with generator C through a temperature responsive control means 24. Temperature control 24 may be a thermostatic bulb or a bimetallic thermostat which is positioned within the interior of refrigerator D. Temperature control means 24 is adjustable in a conventional manner and senses the temperature within refrigerator D to close and complete the control circuit to compressor 16 when the temperature within refrigerator D rises above the setting. Temperature sensing means 24 again opens to de-energize compressor 16 when the temperature within refrigerator D falls to the desired setting.

In accordance with a preferred arrangement, an air pump E has a conduit 26 connected therewith for supplying air to waste material in waste tank B. Conduit 26 may enter the top of waste tank B and have its end 28 located adjacent the bottom interior of waste tank B. Operation of air pump E supplies air through conduit 26 and the air bubbles upward through the waste material in waste tank B. Pump E may be a vibrating diaphram air pump or a peristaltic pump, or any other suitable known type of electrically driven air pump.

Waste tank B has a vent pipe connected with the top thereof so that the interior of waste tank B is open to atmosphere. Air supplied to waste tank B by pump E may then flow out of conduit 30.

In a preferred arrangement, air pump E is connected in the control circuit for the appliance defined by refrigerator D so that air pump E operates only when refrigerator D operates. Air pump E is connected in parallel with compressor 16 and in series with temperature control means 24. Air pump E will then operate only when temperature control means 24 closes to energize compressor 16. Pump E then operates only at periodic spaced intervals of time which correspond with the periodic operating intervals of refrigerator D. This periodic operation of air pump E insures a sufficient supply of air to maintain efficient aerobic bacterial action within the waste material in waste tank B, while preventing excess air which might oxidize the aerobic bacteria themselves. The described arrangement is also highly efficient and economical because it uses a control circuit of an existing appliance as a timing device to control the periodic operation of the air pump at spaced intervals of time.

Boats and motor homes are normally provided with a plug-in connection for connection to a municipal electrical power supply when docked or parked. It is then unnecessary to use generator C so that refrigerator D and the other electrical devices on the conveyance can be operated with the municipal power supply. The arrangement of the present invention is highly desirable under such circumstances. For example, when a boat is docked for one week without being used, it is desirable to provide some air to the waste material in order to purify such material which is in waste tank D from previous use of boat A. When the boat is docked without being used, refrigerator D is also not being used and will operate very infrequently. This also reduces the operating time of pump E and supplies just sufficient air for efficient aerobic action within waste tank B. A continuously operating pump would have to be left on when the boat is not in use, and might supply excess air to the waste material when boat A was not being used and additional waste material was not being supplied to waste tank B. Leaving such a pump on when the boat is not in use is also a waste of electricity. The periodic timing control arrangement also operates in accordance with the manner in which the conveyance is being used. For example, use of boat A also results in use of refrigerator D and compressor 16 will operate more frequently to maintain the desired temperature setting. Use of boat A also results in supply of more waste material to waste tank B. Therefore, pump E will operate more frequently during use of boat A and this is the desirable arrangement for efficient aerobic treatment of the waste material.

Those skilled in the art will recognize that it is possible to connect the air pump to another appliance of a type which operates at periodic intervals of time. It is also possible to provide a separate timing control device for periodically operating the air pump although this is a less efficient and more expensive arrangement.

While the invention has been described with reference to a preferred embodiment, it is obvious that equivalent alterations and modifications will occur to others skilled in the art upon reading and understanding this specification. The present invention includes all such equivalent alterations and modifications and is limited only by the scope of the claims.

Having thus described my invention, I claim:

1. In a waste disposal system including a waste tank for receiving liquid and organic waste material, electrically driven air pump means connected with said tank for aerating said waste material, and automatic pump control means for periodically energizing said pump means to aerate said waste material at spaced intervals of time, the improvement comprising; said pump control means comprising an electrical appliance having a control circuit including temperature responsive control means for operating said appliance at spaced intervals of time to maintain a predetermined temperature, said pump being connected in said control circuit for simultaneous operation with said appliance.

2. The system of claim 1 wherein said appliance comprises a refrigerator.

3. The system of claim 1 and further including a human conveyance, said system being installed on said conveyance.

4. The system of claim 3 wherein said appliance comprises a refrigerator.

5. A method for aerating liquid and organic waste material in a waste tank by operating an air pump, comprising the steps of; providing an electrical appliance having temperature responsive control means for operating said appliance at spaced operating intervals of time to maintain a predetermined temperature, connecting said air pump in circuit with said appliance, and periodically energizing said pump simultaneously with said appliance to aerate said waste material at spaced intervals of time corresponding with said spaced operating intervals for said appliance.

* * * * *